2,892,809

EPOXY RESINS

William E. St. Clair, Pittsburgh, Pa., assignor to Koppers Company, Inc., a corporation of Delaware No Drawing. Application November 10, 1955
Serial No. 546,256

6 Claims. (Cl. 260—54)

This application is concerned with a new and improved method of preparing oxygen containing resins and is particularly concerned with the etherification of hydroxyl radical containing resins to produce epoxy resins containing a maximum oxirane oxygen content which are new and useful.

Heretofore epoxylated compounds in general have been prepared by reacting compounds containing hydroxyl groups bonded directly to an aromatic nucleus with a haloepoxyalkane in the presence of a strong alkali. Various procedures have been proposed, such as for example, that in which a hydroxyl radical containing aromatic compound is dissolved in aqueous alkali, adding the haloepoxyalkane to this solution and heating to yield the desired ether. An alternative method suggested is a similar reaction under substantially anhydrous conditions. Neither of these processes produces etherified products having significantly high oxirane oxygen contents.

It is an object of this invention to make available an improved process of preparing epoxy resins having higher oxirane oxygen contents and in greater yield than heretofore obtainable with the aforementioned methods.

It is a further object of this invention to prepare epoxy resins having maximum oxirane oxygen content by the complete or substantially complete etherification of resins containing ring-substituted hydroxyl groups.

It has now been discovered, as a feature of this invention, that it is readily possible to produce epoxy resins having the theoretical maximum oxirane oxygen content by the substantially complete etherification of such resins in general. In particular the present invention has application to the etherification of the hydroxyl groups contained in aldehyde resins such as for example, a phenolic-aldehyde resin such as a phenol, resorcinol or cresol-formaldehyde resin, or in a mixture of a monomeric phenolic compound such as phenol, resorcinol, cresol, etc., and a resin of the aforementioned class.

The present process embraces a process of preparing epoxy resins in which substantially all of the starting hydroxyl groups are etherified by the technique of dissolving a resin containing ring-substituted hydroxyl groups in a quantity of a haloepoxyalkane in excess of that required for complete etherification of said resin, heating the solution to a temperature below the decomposition temperature of the haloepoxyalkane, adding gradually to this solution an alkali hydroxide dissolved in a lower alcohol and recovering the desired epoxy resin thereby produced. "Lower alcohol" as used herein is intended to define aliphatic alcohols having less than five carbon atoms, particularly those in which the alkali hydroxides are soluble.

The resins, eminently suitable for etherification in accordance with the invention, embrace polymeric materials, such as for example, the phenol-formaldehyde, phenol - resorcinol - formaldehyde, cresol - formaldehyde, cresol-resorcinol-formaldehyde resins, etc. Broadly, any polymeric material having a hydroxyl group attached directly to an aromatic nucleus of said resin is contemplated. Preferably, these resins are of a fusible nature since their etherification with an epoxyalkyl group produces a resin capable of being rendered infusible and insoluble by reaction of the oxirane ring of the epoxyalkyl group with a variety of substances known in the art.

While epichorohydrin is a preferred haloepoxyalkane in accordance with this invention there can be utilized any haloepoxyalkane having a halogen atom which will react at a temperature below the decomposition temperature of its oxirane ring. Illustrative, but not limitative of suitable haloepoxyalkanes are, for example.

1-chloro-2,3-epoxybutane
1-chloro-3,4-epoxybutane
2-chloro-3,4-epoxybutane
1-chloro-2-methyl-2,3-epoxypropane
1-bromo-2,3-epoxypentane
2-chloromethyl-1,2-epoxybutane
1-bromo-4-methyl-3,4-epoxypentane
1-bromo-4-ethyl-2,3-epoxypentane
4-chloro-2-methyl-2,3-epoxypentane
1-chloro-2,3-epoxyoctane
1-chloro-2-methyl-2,3-epoxydecane In a more specific aspect a hydroxyl containing resin of the foregoing description is dissolved in a quantity of haloepoxyalkanes in excess of that required for complete etherification of the starting hydroxyl groups. This excess may be slight and while it can be used in any desired amount little advantage is gained by utilizing an amount of haloepoxyalkane in excess of 12 mols per hydroxyl group. More specifically it is preferred to use quantities of haloepoxyalkanes in the range of from about 2.5 to 5.0 mols per hydroxyl group.

The solution of the resin thus prepared is then heated to a temperature of at least about 60° C. but below the decomposition temperature of the haloepoxyalkane prior to the addition of the alcoholic alkali hydroxy solution. This is an important aspect of this invention since any deviation from this step does not produce the desired high yields of etherified products having a high oxirane oxygen content.

The alkali hydroxides which are eminently suitable in the process of this invention are those of group I of the periodic system, specifically lithium, sodium, potassium, rubidium and cesium. Specifically, an alkali hydroxide of this group is dissolved in a lower alcohol and this alcoholic solution is added dropwise to the aforedescribed heated solution of hydroxy aromatic compound in haloepoxyalkane. The quantity of hydroxide employed is such that there is a molecular amount equivalent to the number of hydroxyl groups present to be etherified.

The oxirane oxygen content as described herein is determined by dissolving 1 gram of the etherified reaction product in 25 milliliters of one-third normal pyridine hydrochloride and refluxing the solution for 1 hour. Thereafter the solution is transferred to another vessel with approximately 50 mls. of pyridine. Excess pyridine hydrochloride is titrated potentiometrically with 0.33 N alcoholic potassium hydroxide. Within 0.10 ml. of the endpoint the addition of 0.10 ml. of titrant causes a change of 1 pH unit.

The improvement realized in oxirane oxygen content by following the process of this invention is highly significant. This improvement can be illustrated most vividly by comparison with oxirane oxygen contents of compounds prepared in one of the previously described conventional methods. As one illustration glycidyl ethers of a two stage Novolac resin of 3° m,p-cresol-formaldehyde, 1 mol of cresol to 0.70 mol of formaldehyde, have been prepared with oxirane oxygen contents of as high as 3 percent by reaction of epichlorohydrin with an aqueous potassium hydroxide solution of the resin at room temperature. The 3° m,p-cresol-formaldehyde resin in a condensation polymer of formaldehyde and a commercially available mixture of meta-cresol, para-cresol and other tar acids, having a 5-95% distillation range of 3° C. In contrast, the theoretical maximum oxirane oxygen content is 9.26 percent. The magnitude of improvement in oxirane oxygen realized by means of this invention will be illustrated more clearly in the examples.

The following examples are given by way of illustration and not by way of limitation. Several examples of prior art methods are included as mentioned above for comparative purposes. All parts and percentages are by weight unless otherwise specified.

EXAMPLE I

Here is described a prior art preparation of glycidyl ether of 3° m,p-cresol-formaldehyde resin (hereinbefore described), 1 mol cresol to 0.70 mol formaldehyde, employing aqueous potassium hydroxide.

The glycidyl ether was prepared at a temperature of from about 25 to 30° C. by reacting 1 mol of the resin in 25% aqueous KOH and 5 mols of epichlorohydrin. At 2-hour period intervals during a 10-hour reaction period samples were taken and oxirane oxygen content and stroke cure times, with and without diethylene triamine were determined. These results are shown in Table I opposite Example I(a).

This example was repeated except for the reaction period which was extended to 24 hours. Prolonged reaction gave no appreciable improvement in either oxirane oxygen content or stroke cure time. These results are shown in Table I opposite Example I(b). The following is Table I:

*Table I*

STROKE CURE TIMES AND OXIRANE OXYGEN ANALYSES FOR GLYCIDYL ETHERS OF A 1C/0.70F 3° M,P-CRESOL-FORMALDEHYDE RESIN

| Example | Hours of Reaction | Stroke Cure Time at 200° C. | | Oxirane Oxygen Content (Wt. percent) |
|---|---|---|---|---|
| | | No Curing Agent (Secs.) | With DET (Secs.) | |
| I(a) | 2 | ¹25 | 1-5 | 2.8 |
| | 4 | ¹46 | 1-5 | 2.9 |
| | 6 | ¹49 | 1-5 | 2.9 |
| | 8 | ¹50 | 1-5 | 2.4 |
| I(b) | 2 | ¹1-5 | | 2.9 |
| | 4 | ¹33 | | 2.9 |
| | 8 | ¹52 | | 2.8 |
| | 12 | ¹57 | | 2.7 |
| | 16 | ¹67 | | 2.9 |
| | 20 | ¹77 | | 2.8 |
| | 24 | ¹83 | 1-5 | 2.8 |

¹ Indicates rubbery cure.

EXAMPLE II

This example is illustrative of the criticality of temperature. One mol of the resin employed in Example I was dissolved in 3 mols of epichlorohydrin at room temperature. After standing for a short period there was added to this resin solution 1 mol of potassium hydroxide in 275 ml. of 88% ethanol at room temperature with stirring. Temperature rose from 25° C. to 60° C. in 15 minutes, and the reaction mixture was then cooled to 40° C. and maintained at this temperature for approximately 6 hours. A salt was filtered from the reaction mixture and the reaction mixture washed and dried to give a product analyzing 4.2% oxirane oxygen. As indicated previously the theoretical maximum oxirane oxygen content of glycidyl ethers of this resin is 9.26%.

In an attempt to increase the oxirane oxygen content a glycidyl ether was prepared by reacting 1 mol of the same resin with 5 mols of epichlorohydrin and 1 mol potassium hydroxide in absolute ethanol. The reaction mixture was stirred for about 2 hours with no attempt to control the exothermic reaction. After filtering reaction products, the weight of the salt cake indicates that 0.94 mol of epichlorohydrin had reacted. From this salt cake was obtained an acetone-soluble epoxy resin containing 4.5% oxirane oxygen.

EXAMPLE III

Employing the conditions of the invention, 702 parts of the cresol-formaldehyde resin employed in Examples I and II were dissolved in 2776 parts of epichlorohydrin and the solution brought to reflux. A solution of 396 parts of potassium hydroxide in 1500 parts of 95% ethanol was added dropwise and reaction maintained for a period similar to that of the foregoing examples. In similar manner the reaction product was worked up to give 678 parts of a product corresponding to 93.5% of theory. The product analyzed 10.1% oxirane oxygen compared to the theoretic oxirane oxygen content of 9.3%.

EXAMPLE IV

Example III is repeated with sodium hydroxide to give a similar product.

EXAMPLE V 940 parts of a phenol-formaldehyde resin, 1 mol phenol to 0.80 mol formaldehyde, were dissolved in 4164 parts of epichlorohydrin and this solution heated to 117° C. A solution of 594 parts of potassium hydroxide in 2750 parts of 95% ethanol was added dropwise in a 1-hour period at the end of which reflux temperature was 83° C. Reflux was conducted for 2 hours and the reaction product filtered and distilled to give a semi-soft resinous product in a yield of 1348 parts corresponding to 93.5% of theory. This product analyzed 11.2% oxirane oxygen compared to the theoretical oxirane oxygen content of 9.98%. Analysis of this product for chlorine indicates 0.03% which is negligible.

EXAMPLE VI

Example V is repeated with sodium hydroxide to give a similar product.

EXAMPLE VII 349.5 parts of an acid-catalyzed resorcinol-formaldehyde resin, 1 mol resorcinol to 0.6 mol of formaldehyde, were dissolved in 2776 parts of epichlorohydrin. To this solution at reflux were added gradually 396 parts of potassium hydroxide in 1500 parts of 95% ethanol. A product was obtained in a yield of 654 parts corresponding to 94.6% of theory. This product was a soft resin analyzing 16.5% of oxirane oxygen content compared to a theoretical oxirane oxygen content of 13.9%.

EXAMPLE VIII 352.9 parts of a base-catalyzed resorcinol-formaldehyde resin, 1.00 mol resorcinol to 0.68 mol of formaldehyde, were dissolved in 2776 parts of epichlorohydrin. To this solution at reflux was added dropwise a solution of 396 parts of potassium hydroxide in 1500 parts of 95% ethanol. 601 parts of product corresponding to 87.0% of theory were recovered. The product was a soft resin having an oxirane oxygen content of 16.5% as compared to a theoretical oxirane oxygen content of 13.86%.

EXAMPLE IX

Example VIII is repeated with sodium hydroxide to give a product analyzing an equivalent oxirane oxygen content.

EXAMPLE X 118.7 parts of an acid-catalyzed resorcinol-formaldehyde resin, 1 mol resorcinol to 0.6 mol formaldehyde, and 110.1 parts of resorcinol were added to 1850 parts of epichlorohydrin and the solution heated to reflux. To the refluxing solution were added gradually 264 parts of potassium hydroxide in 1000 parts of ethanol. The reaction mixture was heated to 100° C. and the total alcoholic potassium hydroxide solution added over an 80-minute period. At the end of this period the reflux temperature was 82° C. 383 parts of a reaction product were recovered. This product analyzed 11.2% oxirane oxygen as compared to a theoretical oxirane oxygen content for the mixture of 13.07%.

It will be noted that in several of the foregoing examples the oxirane oxygen content of the epoxy resin products is in excess of the theoretical oxirane oxygen content. The reason for this is not known. Analysis for unreacted epichlorohydrin shows negligible amounts of chlorine in the products thus indicating that unreacted epichlorohydrin does not account for the high values.

From the foregoing examples it is clear that a substantial improvement in the method of etherifying resins containing ring-substituted hydroxyl groups is herein presented. The magnitude of improvement in each instance is clear and completely unexpected. While certain illustrative examples are given it is obvious that other hydroxy-containing resins are within the scope of this invention and can be substituted with ease to produce substantially completely etherified products.

The products of this process are new and novel resins which are useful as adhesives, binders, potting compounds, laminating agents, surface coatings, etc. For instance, when admixed with a curing agent containing active hydrogens, these products can be cross-linked to the insoluble, infusible state without addition of heat. This is a substantial improvement over the art in the formulation of metal to metal adhesives, since no heat or pressure is needed for high strength bonding.

These products differ from those in the art in that they contain an active glycidyl group on each hydroxyl. Also within the scope of this invention are partially etherified resins. For example by control of the amount of caustic, glycidyl groups proportional to the molar quantity of caustic added can be obtained.

While the invention has been described with particular embodiments thereof it will be understood that in its broadest aspects the invention may be variously embodied within the scope of the invention as set forth herein and in the appended claims.

What is claimed as new is:

1. Method of making substantially completely etherified vicinal-type epoxy resins comprising dissolving a composition selected from the group consisting of (a) a novolak resin comprising a condensation product of formaldehyde and a phenolic compound selected from the group consisting of phenol, cresol and resorcinol and (b) a mixture of said condensation product and a phenolic compound selected from the group consisting of phenol, cresol and resorcinol, in a quantity of haloepoxyalkane in excess of that required for complete etherification, heating the resulting solution to a temperature of at least about 60° C. and below the decomposition temperature of said haloepoxyalkane, adding gradually thereto an alkali metal hydroxide dissolved in a monohydric aliphatic alcohol having less than 5 carbon atoms, the molecular amount of said alkali metal hydroxide added being substantially equivalent to the number of hydroxyl groups to be etherified, and recovering said vicinal-type epoxy resin.

2. Method according to claim 1 wherein said condensation product is a phenol-formaldehyde resin.

3. Method according to claim 1 wherein said condensation product is a resorcinol-formaldehyde resin.

4. Method according to claim 1 wherein said condensation product is a cresol-formaldehyde resin.

5. Method according to claim 1 wherein said composition is a mixture of said condensation product and resorcinol.

6. Method according to claim 1 wherein said alcohol is ethyl alcohol.

References Cited in the file of this patent

UNITED STATES PATENTS

| | | |
|---|---|---|
| 2,512,996 | Bixler | June 27, 1950 |
| 2,658,885 | D'Alelio | Nov. 10, 1953 |
| 2,659,710 | Martin | Nov. 17, 1953 |
| 2,716,099 | Bradley | Aug. 23, 1955 |
| 2,801,227 | Goppel | July 30, 1957 |

OTHER REFERENCES

Harris et al.: "Modified Phenol-Formaldehyde Resins," article in Modern Plastics, February 1954, pp. 146, 149, 150 and 226.